United States Patent [19]

Hutchcraft

[11] Patent Number: 5,045,834
[45] Date of Patent: Sep. 3, 1991

[54] DOCK AND TRAILER PROTECTOR

[76] Inventor: Wesley H. Hutchcraft, 7402 Ireland Dr., Louisville, Ky. 40219

[21] Appl. No.: 389,069

[22] Filed: Aug. 3, 1989

[51] Int. Cl.⁵ .............................................. B60Q 1/00
[52] U.S. Cl. .................................... 340/436; 340/431; 340/932.2; 340/958
[58] Field of Search ............... 340/436, 435, 431, 463, 340/484, 901, 437, 958, 932.2, 903, 933, 468, 469, 471, 474; 116/28 R, 28 A

[56] References Cited

U.S. PATENT DOCUMENTS

| | | |
|---|---|---|
| 2,444,635 | 7/1948 | Dennis, Jr. ............................ 340/436 |
| 3,012,225 | 12/1961 | Holt et al. . |
| 3,409,874 | 11/1968 | Bowler et al. . |
| 3,510,837 | 5/1970 | Lepore et al. ....................... 340/436 |
| 3,923,330 | 12/1975 | Viall, Sr. et al. ................... 340/436 |
| 4,184,655 | 1/1980 | Anderberg .......................... 340/958 |
| 4,249,159 | 2/1981 | Stasko ................................. 340/958 |

Primary Examiner—Joseph A. Orsino
Assistant Examiner—Brent A. Swarthout
Attorney, Agent, or Firm—Middleton & Reutlinger

[57] ABSTRACT

A warning device provides a plurality of signals as a trailer or other movable object approaches a dock or other stationary object to prevent impact which could cause damage.

3 Claims, 4 Drawing Sheets

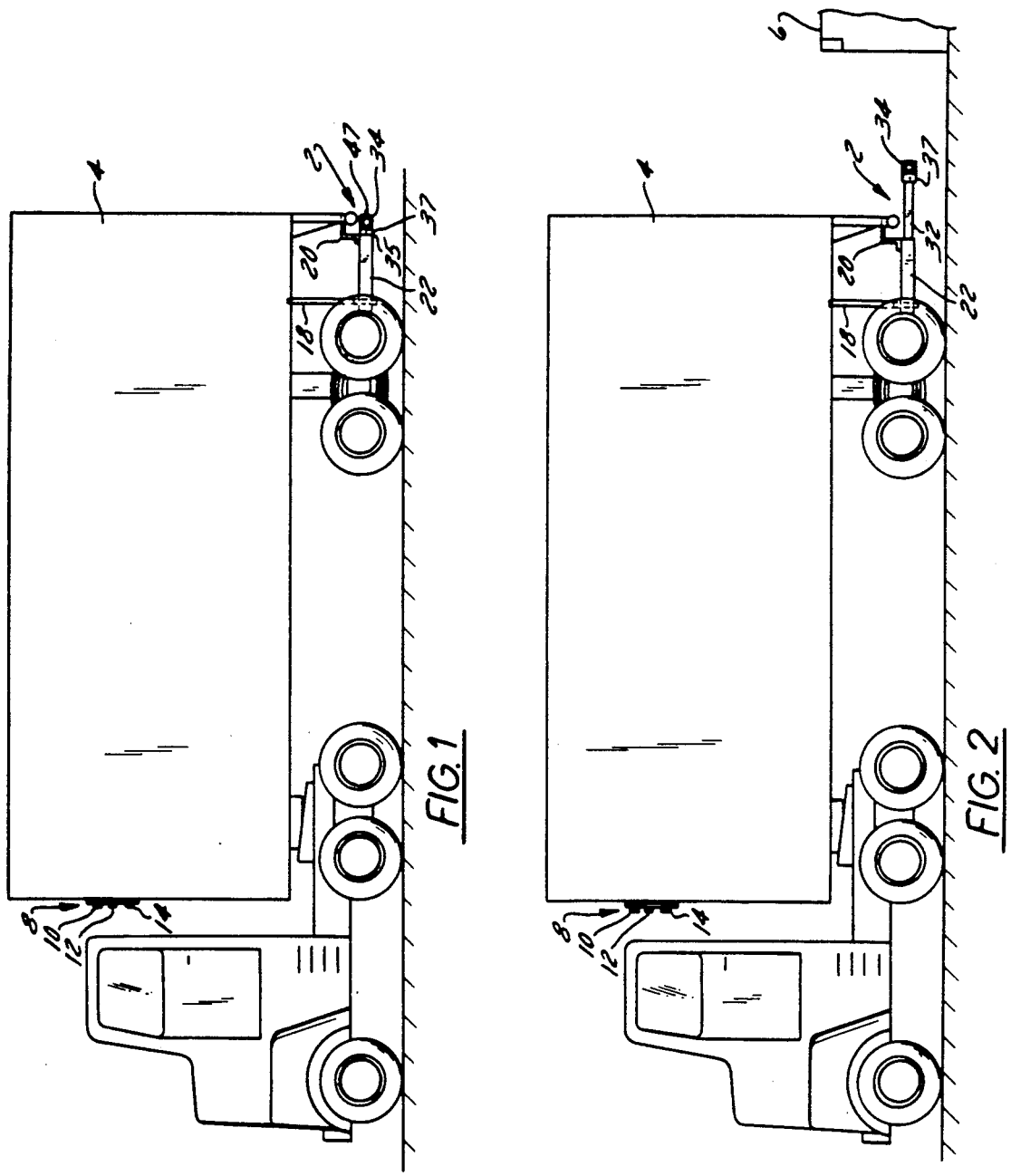
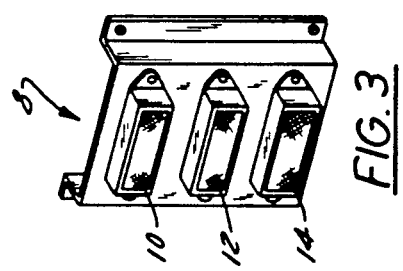

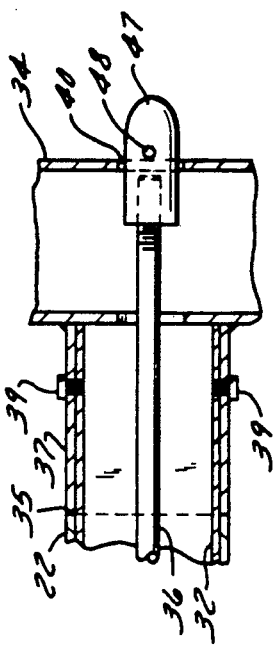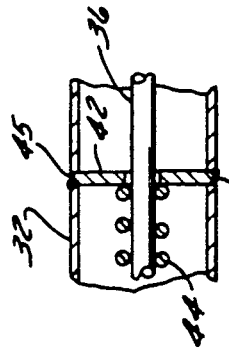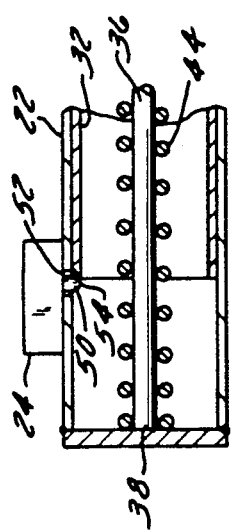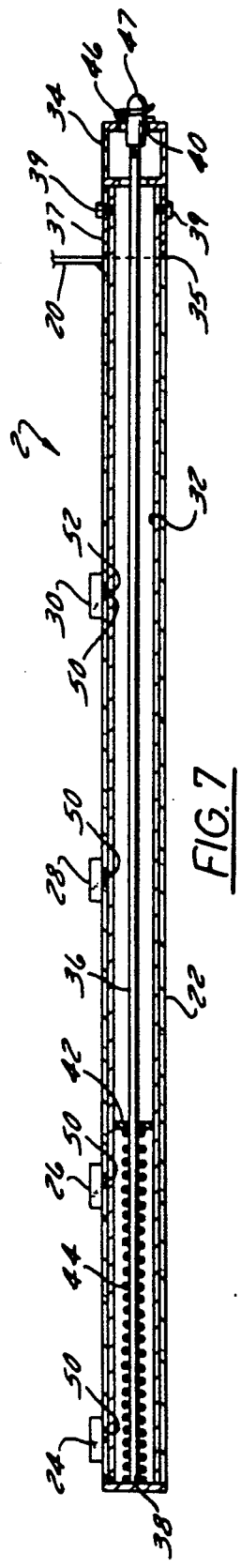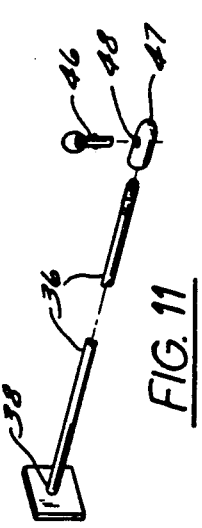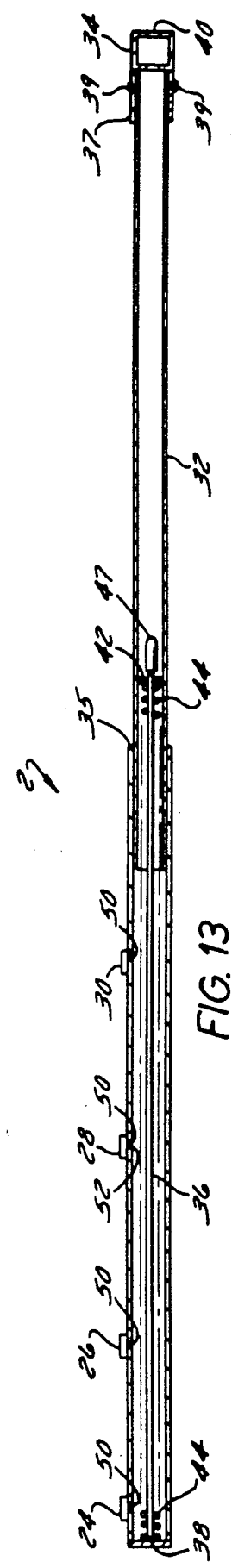

DOCK AND TRAILER PROTECTOR

BACKGROUND OF THE INVENTION

A substantial amount of property damage is caused every year by trailers hitting objects as they back up. It is very difficult if not impossible for a truck driver to accurately judge the distance between the back of his trailer and the loading dock, and it is often impossible for the driver to see objects that are located directly behind the trailer. As a result, trailers often hit loading docks or other objects, damaging the trailer, the contents in the trailer, or the dock or any other object that has been hit.

There are some devices in the prior art which are designed to hit the dock before the rest of the trailer hits the dock and which sound an alarm when they hit. This is of some use to the driver to help him avoid impact of the trailer with the dock, but, in order to give the driver adequate warning time, it may cause him to stop before the trailer is in the best position. It does not help him bring the trailer smoothly into the proper docking position, which is what the driver really wants and needs.

SUMMARY OF THE INVENTION

The present invention provides a device which contacts the dock or other obstacle well before the trailer hits it, indicates the distance between the trailer and the dock as the driver continues backing up, and, finally, tells the driver when to stop in order to be in the proper position relative to the dock. This arrangement is much more useful to the driver, who not only wants to avoid a damage-causing impact but also wants to stop in the right place for loading and unloading.

The present invention provides a rigid feeler member which has the advantage of always contacting the dock a fixed distance away from the trailer but which is also collapsible, thereby avoiding damage to the feeler member upon contact with the dock.

The present invention uses green, yellow and red lights similar to traffic lights as indicators, so that the driver's instincts about when to go, slow down, and stop are used to guide the driver to the dock.

The present invention locates the indicator lights on the trailer directly behind the cab of the truck, so the indicator lights are readily visible to the driver backing up. This is much more useful than indicator lights on the instrument panel of the truck.

BRIEF DESCRIPTION OF THE DRAWINGS

FIG. 1 is a side view of a truck and trailer with the protector device of the present invention mounted on the trailer and shown in the retracted position;

FIG. 2 is a side view of the truck of FIG. 1, with the protector in the extended position;

FIG. 3 is a perspective view of the indicator lights which are part of the protector device;

FIG. 7 is a side sectional view of the device of FIG. 5;

FIG. 8 is an enlarged top sectional view of the end portion of the device of FIG. 7;

FIG. 9 is an enlarged broken-away side sectional view of the spring portion of the device shown in FIG. 7 with the device partially extended;

FIG. 10 is an enlarged broken-away side sectional view of a portion of the device shown in FIG. 7;

FIG. 11 is an exploded perspective view of the rod of FIG. 7 with a different type of keeper pin;

FIG. 12 is a broken-away exploded perspective view of the shaft and spring stopper shown in FIG. 7;

FIG. 13 is the same view as FIG. 7 except that the bar is in the extended position, and the spring is shown in schematic form.

DESCRIPTION OF THE PREFERRED EMBODIMENT

Figure 4:
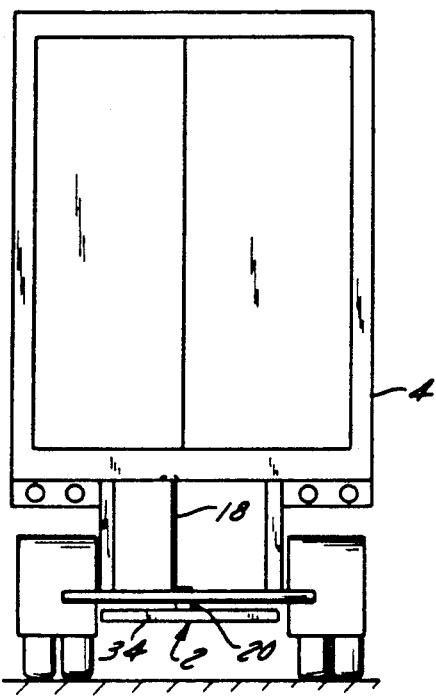
FIG. 4 is a back view of the truck of FIG. 1.
Figure 5:
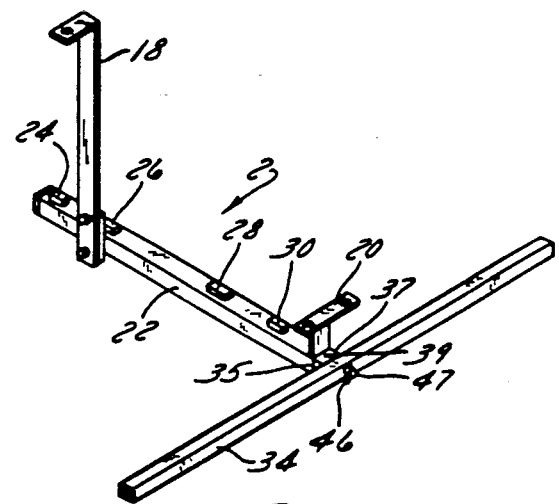
FIG. 5 is a perspective view of the protector device of the present invention shown in the retracted position.

In FIG. 1, the trailer protector 2 is shown mounted under the trailer 4 in its retracted position. The retracted position is the usual position of the protector when driving the truck forward. In FIG. 2, the protector 2 is in its extended position as the trailer 4 is backed toward the dock 6. FIG. 3 shows the set of red, yellow and green indicator lights 8, with the red light 10 on top, yellow light 12 in the middle, and green light 14 on the bottom. As shown in FIG. 2, this set of lights 8 is mounted on the front 16 of the trailer 4 directly behind the truck cab.

Referring now to FIGS. 5-13, the protector 2 includes a tall forward mounting bracket 18 and a shorter rear mounting bracket 20 which are bolted or welded to an elongated hollow member 22. The mounting brackets are used to mount the protector on the trailer and are designed to bolt to the rear bumper and the floor of the trailer. Several switches are mounted on the top of the elongated, hollow member 22. On the prototype device, the switches used are Radio Shack part number 275-017 single pole double throw switches with a three-quarter inch roller lever. The forwardmost switch 24 serves to activate the warning circuit. The next switch 26 activates the red light 10; the next switch 28 activates the yellow light 12; and the backmost switch 30 activates the green light 14.

Figure 6:
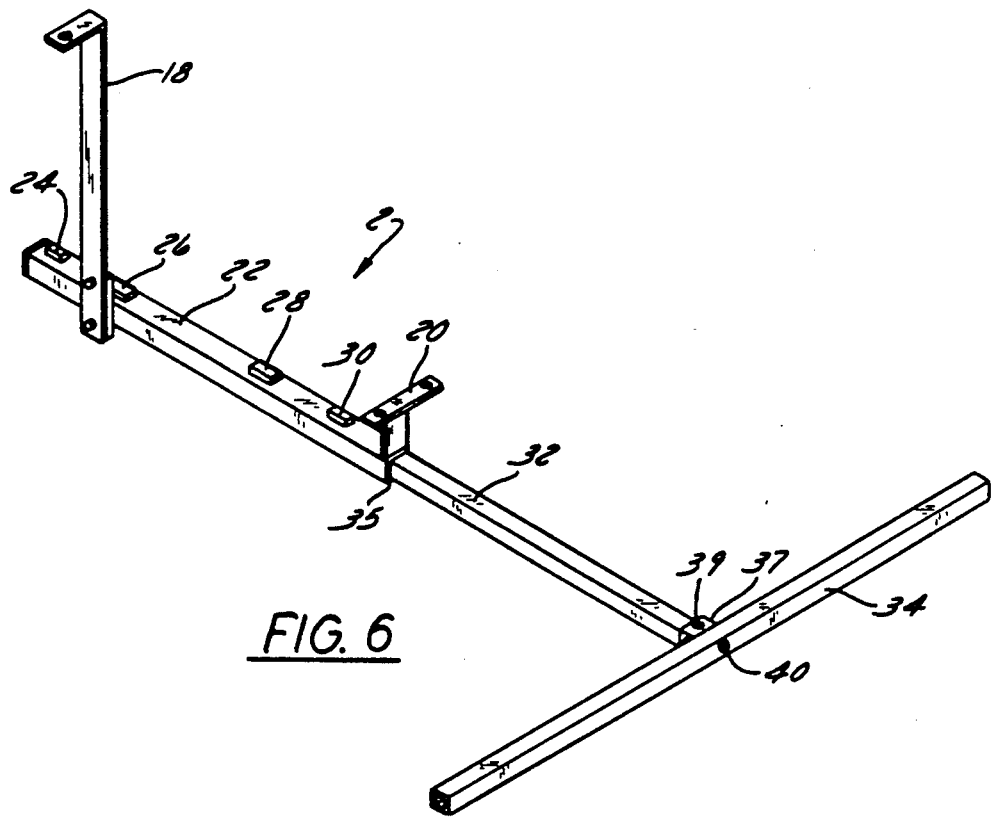
FIG. 6 is a perspective view of the protector device in the extended position.

As shown in FIG. 6, an inner elongated member 32 is telescopically mounted inside the elongated hollow member 22 and has at its backmost end a T-bar 34 which is welded on. The cooperating portions of these elongated members and switches are shown best in FIGS. 7 through 13.

Looking first at FIG. 7, the protector 2 is shown in its retracted position, with the inner elongated member 32 entirely inside the elongated hollow member 22, and with the T-bar 34 abutting the end 35 of the elongated hollow member 22. As can be seen clearly in FIG. 7, the T-bar 34 is welded onto a sleeve member 37, which is bolted onto the inner elongated member 32 by means of bolts 39. The sleeve member 37 has the same cross-section as the elongated hollow member 22.

Inside the inner, elongated member 32 is a rod 36 which is attached at its forwardmost end 38 to the front end of the elongated hollow member 22 and, at its back end, projects out through an opening 40 in the center of the T-bar 34. In FIG. 7, the front end of the inner, elongated member 32 abuts the front end of the elongated hollow member 22. A spring keeper 42 is mounted around the rod 38 and through slots 45 in the inner, elongated member 32, and is welded to the member 32, so that the spring keeper 42 is fixed with respect to the inner, elongated member 32. The spring 44 is mounted around the rod 36. The spring 44 abuts the spring keeper 42 at its back end and abuts the front of the elongated hollow member 22 at its forward end, thereby biasing the inner, elongated member 32 so that it will tend to move to its extended position. An end cap 47 is threaded on the back end of the rod 36, and a pin 46 extends through a hole 48 in the end cap 47 to keep the protector 2 in its retracted position.

The switches or triggers 24, 26, 28 and 30 are shown in FIG. 7 to have movable projections 50 which project through their respective holes 52 in the elongated hollow member 22 so that, when the inner, elongated member 32 moves out from under each switch, the respective movable projection 50 projects down into the hole 52 and into the interior of the elongated hollow member 22. As shown in the enlarged view in FIG. 9, the front end of the inner, elongated member 32 is tapered in its outer surface so that, when the inner, elongated member 32 moves forward to its retracted position, it will push the movable projection 50 of each switch back up as it passes through. The end 54 of each movable projection 50 is rounded to facilitate engagement with the tapered forward end of the inner, elongated member 32.

FIGS. 14–18 are schematics of the simple parallel circuit involved in the present invention. The electrical switches 24, 26, 28 and 30 represent the electrical portion of the mechanical switches 24, 26, 28 and 30 shown in previous figures. Likewise, the lights 10, 12 and 14 represent the red, yellow and green lights, respectively. An explanation of the electrical schematics is included in the description of the operation of the protector below.

Figure 14:
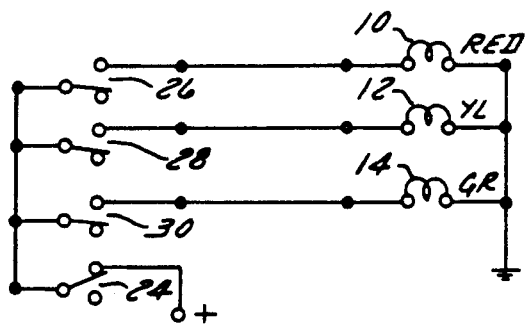
FIGS. 14-18 are schematics of the electrical circuit of the protector showing the switches at various positions corresponding to the different positions of the protector.

The operation of the trailer protector is as follows:

When the trailer is ready to be backed up to the dock, the pin 46 is removed from the end cap 47 of the rod 36, and the spring 44 pushes the inner, elongated member 32 outward to its extended position. As the inner, elongated member 32 moves out, it passes the switches 24, 26, 28 and 30, in that order, and, as it passes each switch, the movable projection 50 of each respective switch moves down into the interior of the elongated hollow member 22. When the movable projection 50 of the activating switch 24 moves down, it closes the switch 24, which powers the circuit for the protector device, and, when the inner, elongated member is in the fully extended position, all the other switches 26, 28, 30 are open, and the warning lights are off, as shown in FIG. 14.

Figure 15:
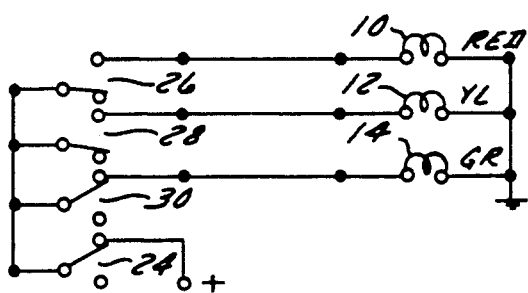

When the T-bar 34 contacts an obstacle, such as a loading dock 6, it begins to collapse. As the forward end of the inner, elongated member 32 reaches the outermost switch 30, it pushes up the projection 50 of that switch, closing the switch 30, as shown in FIG. 15, causing the green light 14 to be lit. This lets the driver know that the trailer 4 is a certain fixed distance from the dock 6. (In this embodiment, that distance is set at 1.5 feet.)

Figure 16:
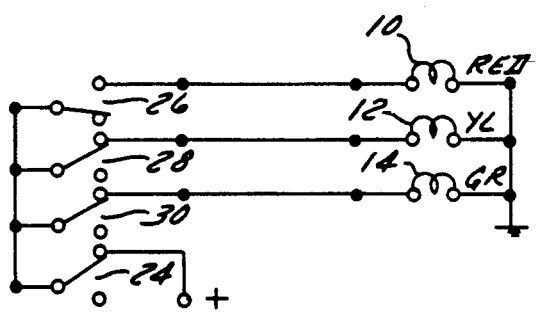
Figure 17:
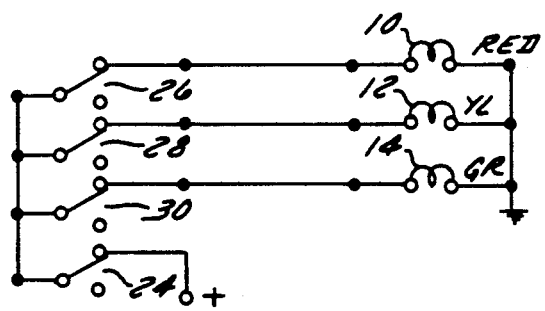

Now the driver will progress slowly toward the dock 6, with the inner, elongated member 32 telescopically collapsing into the elongated hollow member 22 until it contacts the next switch 28, which closes, causing the yellow light 12 to be lit, as shown in FIG. 16. Now the driver knows that the trailer 4 is getting close to the dock 6 (in this embodiment nine inches away), and continues to back up the truck slowly. When the inner, elongated member 32 trips the next switch 26, the switch 26 closes as shown in FIG. 17, and the red light 10 comes on, indicating that the driver should stop the truck. (In this embodiment, the red light will come on when the trailer is six inches from the dock, or two inches from the dock bumpers.)

Figure 18:
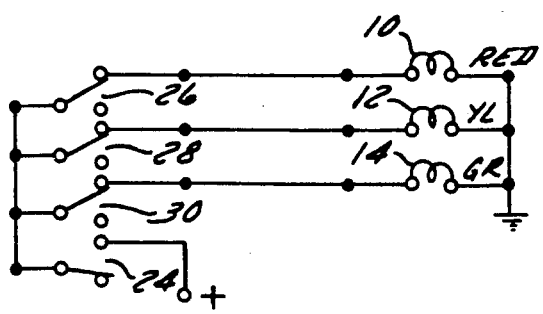

Now the trailer 4 is properly docked, and it can be loaded or unloaded, as desired. Once the loading is finished, the inner, elongated member 32 is pushed all the way into the elongated hollow member 22, until it reaches the position shown in FIG. 7, at which point the end cap 47 projects out. A pin 46 is inserted into the hole 48 in the end cap 47 to retain the protector 2 in the retracted position. Pushing the front end of the inner, elongated member 32 past the activating switch 24 opens the switch 24 and removes power from the circuit as shown in FIG. 18.

It will be obvious to those skilled in the art that modifications may be made to the embodiment described above. For example, the protector may be mounted on the loading dock instead of on the trailer. A series of bells and whistles, L.E.D. readouts, or other warning signals could be used instead of or in addition to the warning lights shown here. Other modifications could also be made.

What is claimed is:

1. A warning device to protect a movable object and a stationary object, such as a trailer and a dock, respectively, from impact with each other, comprising:
   a fixed member adapted to be rigidly mounted on one of the objects to be protected;
   a movable member movably mounted on the fixed member by a mounting means consisting solely of a single telescopic mounting connection in which the movable member slides in a substantially straight line relative to the fixed member;
   said movable member being adapted to contact the other object to be protected and to move relative to the fixed member as the movable object approaches the stationary object; and further comprising means for generating at least two warning signals in a preselected sequence in response to the relative motion of the fixed and movable members as the movable object approaches the stationary object.
   said fixed member comprising a plurality of switch means, each switch means including a movable projection, whereby when the movable member slides into engagement with a first projection a first warning signal is activated, and when the movable member slides into engagement with a second projection a second unique warning signal is activated.

2. A warning device as recited in claim 1, wherein the movable member is telescopically mounted inside the fixed member, and further comprising a rod fixed to the fixed member and projecting inside the fixed member and the movable member so as to help guide the movable member as it slides in and out of the fixed member.

3. A warning device as recited in claim 1, and further comprising warning signals including red, yellow, and green lights.

* * * * *